United States Patent [19]

Ogura et al.

[11] 3,852,725

[45] Dec. 3, 1974

[54] MAGNETIC PLATED WIRE MEMORY DEVICE

[75] Inventors: Isamu Ogura; Takaaki Miyashita; Yoshimoto Aida, all of Tokyo, Japan

[73] Assignee: Oki Electric Industry Co. Ltd., Minato-ku, Tokyo, Japan

[22] Filed: May 21, 1973

[21] Appl. No.: 362,086

[52] U.S. Cl. .................. 340/174 BC, 340/174 M, 340/174 PW, 340/174 S, 340/174 TF

[51] Int. Cl. ... G11c 11/04, G11c 11/14, G11c 5/06

[58] Field of Search ........... 340/174 PW, 174 VA, 340/174 BC, 174 S

[56] References Cited

UNITED STATES PATENTS

| | | | |
|---|---|---|---|
| 3,727,304 | 4/1973 | Granato et al. | 340/174 BC |
| 3,739,361 | 6/1973 | Ishikawa et al. | 340/174 BC |

*Primary Examiner*—James W. Moffitt
*Attorney, Agent, or Firm*—Ostrolenk, Faber, Gerb & Soffen

[57] ABSTRACT

In a magnetic memory device having row windings and, orthogonally aligned word windings, the row windings are arranged in a plurality of parallel planes, with the end of each row winding in the top-most plane being connected at one end to an associated row winding in the next plane therebeneath, the opposite ends of these row windings being connected to the adjacent end of the next plane of row windings therebeneath, and so forth, so as to create an undulating orientation of the row windings. Each planar array of word and row windings is separated from the adjacent plane of word and row windings by a planar magnetic keeper board to minimize the mutual magnetic coupling between row windings and word windings arranged in adjacent planes. The row windings in each plane are maintained in spaced parallel relationship and are electrically insulated from one another by means of tubular insulating tunnel sleeves. The orthogonally oriented word windings are arranged in similar tubular tunnel sleeves and lie in a plane immediately adjacent its associated plane of row windings, with a plane of word windings being provided for each plane of row windings. The opposite ends of the row windings are provided with X- and Y-input terminals for word selection. Additional modular elements of memory assemblies may be connected end to end depending upon the memory capacity desired.

5 Claims, 4 Drawing Figures

MAGNETIC PLATED WIRE MEMORY DEVICE

This invention relates to memory devices and more particularly to a novel memory structure in which the memory planes are arranged in a plurality of parallel planes spaced one above the other, to maximize packaging density.

BACKGROUND OF THE INVENTION

Packaging density of memory planes is of great importance, especially in systems requiring large memory storage capacity. One conventional approach for providing highly reliable magnetic memory systems of high density is to utilize electromagnetized wires employed as row windings having magnetic material electrically deposited thereon, wherein memory planes are placed upon a mounting board. However, it has been found that memory systems of this type have limited storage density and, since they occupy a large volume and require a large number of connecting points when the memory planes are connected to one another, the assembly steps and reliability of the system are degraded.

BRIEF DESCRIPTION OF THE INVENTION

The present invention employs a method in which at least two independent memory planes are arranged on each side of a rigid base board, with readout driving current being taken from each opposing edge of the surfaces of the rigid base boards.

In one preferred embodiment of the present invention, first and second planar arrangements of row windings are arranged on opposite sides of the base board. Each row winding of the planar row winding sets is inserted through an associated tubular tunnel sleeve formed of a suitable insulating material, said sleeves being coplanar. Flexible printed circuit wiring is coupled between a first end of the first and second planar sets of row windings to electrically connect each row winding in one set to an associated row winding in the second set. Third and fourth sets of planar row windings are positioned respectively above and below the first and second sets respectively, so that the opposite ends of the row windings in the first and second sets are electrically connected to an associated row winding of the third and fourth sets to create an undulating pattern of row windings which, instead of being laid side by side, are positioned one on top of the other. The first and third sets of row windings positioned to one side of the rigid base boards are separated by a magnetic keeper board which functions to minimize mutual magnetic coupling between the first and third sets of row windings. A similar magnetic keeper board is positioned between the second and fourth sets of row windings. Four sets of word windings are positioned in orthogonal alignment with an associated one of the four sets of row windings, with the word windings serving as the word selecting driving terminals. The magnetic keeper boards and row adjacents plans serve to minimize magnetic coupling between each planar arrays of word windings.

It is therefore one object of the present invention to provide a novel memory assembly in which as many as four sets of cooperating row and word winding groups are arranged with two groups being arranged on opposite sides of a rigid mounting baseboard, so as to provide for high packaging density.

BRIEF DESCRIPTION OF THE FIGURES

The above, as well as other objects of the present invention, will become apparent when reading the accompanying description and drawings in which.

DETAILED DESCRIPTION OF THE FIGURES

FIGS. 1–3B show a preferred embodiment of the present invention in which electromagnetized wires are employed as row lines in a scratch-pad memory system.

In the memory system of the present invention, a rigid supporting baseboard 1 has all of the memory components mounted thereon, so as to be free from mechanical distortion. Positioned above one surface 1*a* of base board 1 is a pair of memory planes 2*a* and 2*b*, each of which consists of a plurality of spaced parallel row windings 4*a* and 4*b* respectively. The spaced parallel row windings 4*a* are each mounted within an associated tubular insulating tunnel sleeve 3*a* so as to electrically insulate adjacent row windings in memory plane 2*a*. In a similar manner, the spaced parallel row windings 4*b* are mounted within like tubular insulating tunnel sleeves 3*b*, arranged in memory plane 2*b*. The left-hand ends of row windings 4*a* (relative to FIGS. 1 and 2) are electrically coupled to a connecting terminal board 9, for example, by soldering as shown at 9*a*. As shown best in FIG. 1, terminal board 9 has a C-shaped configuration and is provided with a first and second group of output terminal pads 9*b* and 9*b'* to which conductor sleeves 11 and 12 are respectively connected for coupling the outputs of the row windings to peripheral circuitry or, alternatively, to additional memory assemblies.

Figure 2:
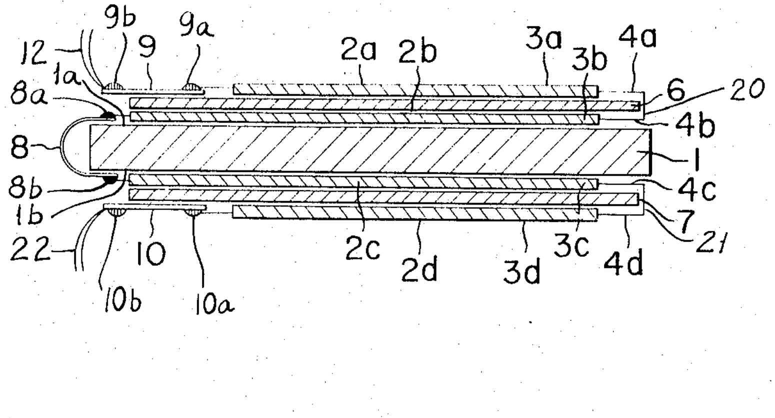
FIG. 2 shows an elevational view of the row winding memory plane provided in the assembly of FIG. 1 in greater detail.

The right-hand ends of row windings 4*a* in memory plane 2*a* are electrically connected to the right-hand ends of the set of row windings 46 in memory plane 2*b* by a plurality of short conductive leads 20, shown best in FIG. 2. Alternatively, elongated row windings bent in a "hair-pin" fashion may be employed to establish this arrangement.

All of the row windings 4*a* and 4*b* preferably have magnetic material deposited thereon (not shown for purposes of simplicity).

Positioned below rigid baseboard 1 are third and fourth sets of spaced parallel row windings 4*c* and 4*d*, forming memory planes 2*c* and 2*d*. The left-hand end of the row windings 4*b* are electrically connected, as shown by solder pads 8*a*, to a flexible printed wiring board 8, which is arranged or bent in U-shaped fashion, as shown best in FIG. 2 and is provided with solder pads 8*b* for electrically connecting associated row windings 4*c* in memory plane 2*c* to the left-hand end of row windings 4*b* in memory plane 26. The right-hand ends of row windings 4*c* are electrically connected to associated row windings 4*d* in memory plane 2*d* at their right-hand ends by short wire sections 21. As was set forth hereinabove, each of the row windings 4*c* and 4*d* may be collectively formed from a single elongated row winding, equal to greater than twice the length of the row windings 4*c* or 4*d*, and bent in a "hair-pin" fashion so as to eliminate the need for soldering or otherwise connecting short wiring sections 21 to each of the wirings 4*c* and 4*d* in memory planes 2*c* and 2*d*, respectively. Each of the row windings 4*c* and 4*d* are coated with a magnetic material (not shown for purposes of simplicty) and, as was the case with windings 4*a* and 4*b*, and are also mounted within tubular insulating tunnel sleeves 3*c* and 3*d* respectively, which sleeves are arranged in coplanar fashion in the memory planes 2*c* and 2*d*. The left-hand ends of the row windings 4*d* are coupled to a terminal board 10 having solder pads 10*a* electrically connecting each row winding 4*d* to the terminal boards. The opposite end of terminal board 10 is provided with solder pads 10*b* for electrically connecting each of the leads 22 thereto so as to connect the memory assembly of FIGS. 1 and 2 to peripheral circuitry, or alternatively, to a second memory assembly of substantially the identical type shown in the Figures.

The pair of row winding sets 4*a* and 4*b* in memory planes 2*a* and 2*b* are spaced from one another as are the pair of row windings sets 4*c* and 4*d*, as shown best in FIG. 2, and each pair respectively have a planar magnetizable board 6 and, interposed therebetween which functions as a magnetic keeper board serving to minimize mutual electro magnetic coupling between word winding set 5*a* and row winding set 4*b*, and also between word winding set 5*b* and row widing set 4*a*. Since the magnetic keeper board 6 is susceptible to having its magnetic characteristics changed rather easily during assembly, and since an extremely thin magnetizing material should preferably be employed, the magnetic material is preferably deposited upon a supporting board (not shown) such as, for example, a glass-epoxy board, to prevent any alteration in the magnetic characteristics of the magnetic keeper board.

A similar magnetic keeper board 7 is positioned between row winding sets 4*c* and 4*d* of memory planes 2*c* and 2*d*, positioned on the opposite side of rigid base board 1, which magnetic keeper board 7 functions in the same manner as the magnetic keeper board 6 described hereinabove.

Figure 1:
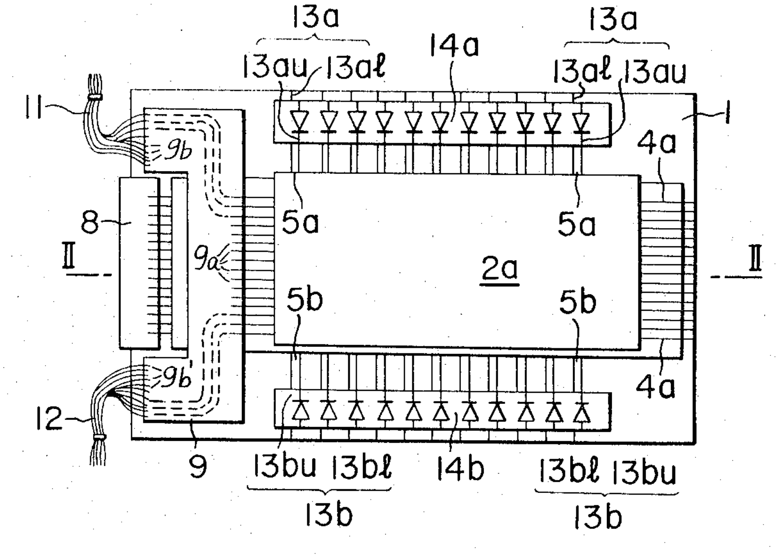
FIG. 1 shows a plan view of a memory assembly designed in accordance with the principles of the present invention.

Each of the planar row winding groups has an associated word, winding group, thereby necessiating the provision of four such word winding groups. For purposes of simplicity, however, only two such word winding groups 5*a* and 5*b* are shown in FIG. 1, as being associated with the row winding groups 4*a* and 4*b* of memory planes 2*a* and 2*b*, respectively. The word winding groups 5*a* and 5*b*, as can best be seen in FIG. 1, are arranged so as to be aligned perpendicular (i.e., orthogonal) with their associated row winding groups 4*a* and 4*b*. Each of the word wires in set 5*a* is inserted within elongated tubular insulating sleeves, arranged in an imaginary plane in spaced parallel fashion and positioned immediately upon its associated row winding groups. Thus, word windings 5*a* and row windings 4*a* form memory plane 2*a;* 5*b* and 4*b* comprise memory plane 2*b*, and so forth.

Figure 3A:
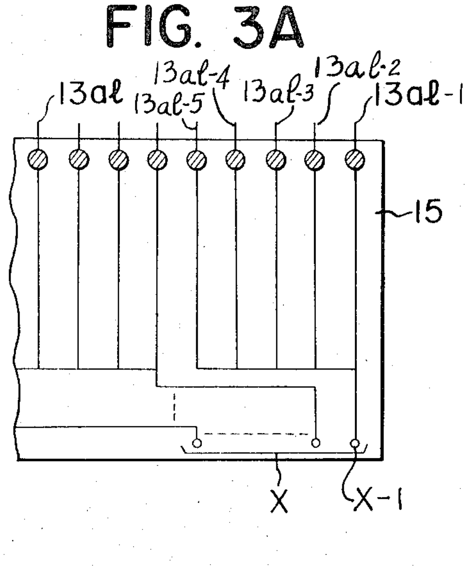
FIGS. 3A and 3B show plan views of the X and Y selecting terminal groups employed for word selection in each memory plane.
Figure 3B:
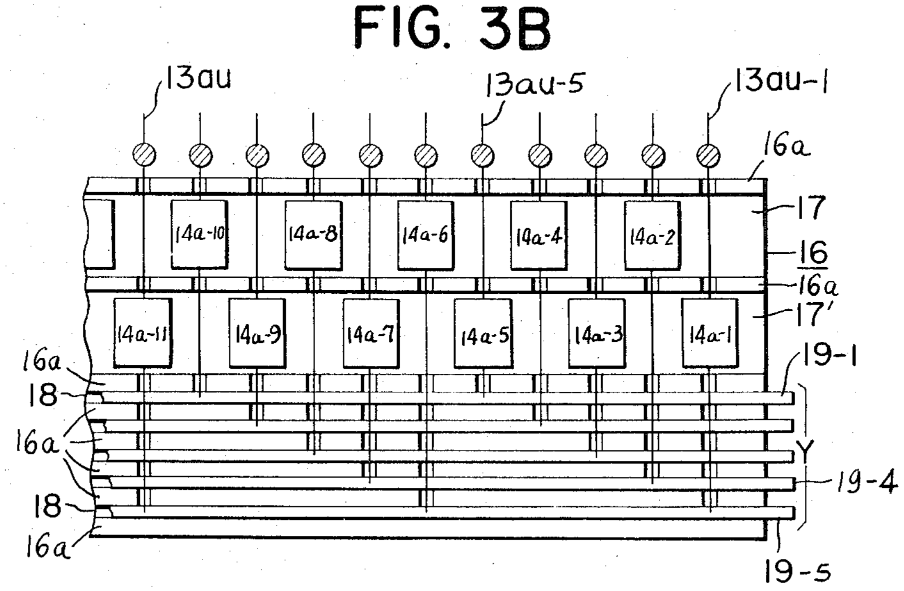

As shown best in FIGS. 1, 3*A* and 3*B*, word driving terminals 13*a* and 13*b* provided for associated word winding groups 5*a* and 5*b* are arranged in opposite edges of each of the memory planes 2*a* and 2*b*. For example, the driving terminals 13*a* which are employed to drive word wires 5*a*, are arranged along the upper edge of the assembly as shown in FIG. 1, while the terminals 13*b* employed to drive word wires 5*b* are arranged along the lower edge of the assembly of FIG. 1. First and second diode groups 14*a* and 14*b* are employed as the switching elements for the word selecting matrix for word wire groups 5*a* and 5*b* respectively, and are mounted on opposite sides of the assembly, as shown best in FIG. 1. Each one of the driving terminals 13*au*, 13*bu*, and so forth, employed for driving word wires 5*a* and 5*b* respectively, are connected to associated ones of the diode groups 14*a* and 14*b*.

For example, terminal 13*au-1*, which is employed as one of the driving terminals for word wire group 5*a*, is electrically connected to one of the diodes 14*a-1*, as shown best in FIG. 3B. Considering the arrangement shown in FIG. 3B, there is provided therein a mounting board 16, having upright partitions or sections 16*a*, to form wide channels 17 and 17' and narrow channels 18 between each of the upright sections 16*a*. Each of the channels 17 has mounted therein a plurality of diodes 14*a*, which diodes are arranged in alternating fashion. For example, diode 14*a*-1 is arranged in channel 17'; the next adjacent diode 14*a*-2 is arranged in channel 17; the next adjacent diode 14*a*-3 is arranged in channel 17', and so forth. The upper terminals (relative to FIG. 3B) of each of the diodes 14*a* are connected to the electrical terminals 13*au*, which in turn are connected to associated ones of the word windings 5*a*. The lower terminals of each of the diodes 14*a* are electrically connected to conductors 19-1 through 19-5, arranged in narrow channels 18, which are formed by certain of the upright partitions 16*a*. For example, diode 14*a*-1 is electrically connected to conductor 19-5, as is every fifth diode 14*a*-6, 14*a*-11, and so forth. In a similar fashion, the lower terminal of diode 14*a*-2 is electrically connected to conductor 19-4, as is every fifth diode 14*a*-7, 14*a*-12 (not shown), and so forth. Diodes 14*a*-3, 14*a*-8, and so forth, are connected to conductor 19-3; diodes 14*a*-4, 14*a*-9, and so forth, are connected to conductor 19-2 and diodes 14*a*-5, 14*a*-10, and so forth, are connected to conductor 19-1.

Terminals 13*al*-1 (see FIG. 3A), which are electrically connected to the opposite ends of the word windings, are further connected in common in groups of five to drive selection input terminals X. For example, terminals 13*al*-5 through 13*al*-5 are all connected in common to terminal X-1 by a printed circuit configuraton, shown best in FIG. 3A, and which is provided on an insulating substrate 15.

The upper set of input conductors Y (see FIG. 3B) cooperate with the lower set of input terminals X (arranged on opposite sides of memory plane 2*a*, shown in FIG. 1, for example) to function as the word selection driving terminals. In a like manner, for the memory plan 2*b* 13*b*, the lower diode group 14*b* cooperates with the upper terminal 13*bl* to function as a word selection driving plane. Selection of one of the Y inputs 19-1 through 19-5, together with selection of one of the X inputs, serves as the selection means for driving a particular row winding point or location along the row windings in the associated memory plane. For example, let it be assumed that the Y input selection for memory plane 2*a* is conductor 19-1. This conductor connects to diodes 14*a*-5, 14*a*-10, 14*a*-15 (not shown), and so forth. Each of these diodes, in turn, electrically couples conductor 19-1 to terminals 13*au*-5, 13*au*-10, 13*au*-15 (not shown), and so forth. Selection of one of X winding X-1 electrically connects terminals 13*al*-1 through 13*al*-5. This establishes an electrical connection between the opposite ends of only word windings 5*a*-5 (not shown), since this is the only winding having both of its ends connected in a completed electrical circuit. Selection of the word winding 5*a*-5 (not shown) in memory plane 2*a* provides magnetic coupling at the point where winding 5*a* -5 orthogonally intersects all of the row windings 4*a* to provide an output signal representative of the magnetized pattern created in the magnetic material coated upon the row windings 4*a* where 5*a*-5 crosses. It should be obvious that a read-in and a read-out phase would be performed in order to store information and subsequently read out such information from the memory assembly.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A memory assembly comprising:

a rigid planar mounting board;

a first set of spaced parallel row windings positioned on one surface of said board;

a second set of spaced parallel row windings arranged on the opposite side of said board parallel to said first set;

a third set of spaced parallel row windings arranged immediately above and in spaced parallel fashion with said first set of row windings;

a fourth set of spaced parallel row windings arranged immediately below and adjacent the second set of row windings and being parallel thereto;

first and second magnetic keeper board means positioned between said first and third sets of row windings and said second and fourth sets of row windings respectively for minimizing mutual electromagnetic coupling between said first and third and said second and fourth sets of row windings;

means included in each row winding set for electrically insulating the row windings of the set from one another;

first connecting means for connecting a first end of each of the row windings in the third set of row windings to an associated one of the row windings in the first set of row windings;

second connecting means for electrically coupling the opposite ends of said windings in said first set of said row windings to associated windings in said second set of row windings;

third connecting means for electrically connecting each of the windings in the second set of row windings to an associated winding in the fourth set of row windings;

first and second end connector means for electrically coupling the remaining ends of the windings in said third and fourth sets of row windings to peripheral circuitry;

first, second, third, and fourth sets of word windings, each set of word windings being comprised of a plurality of spaced parallel word lines; said first, second, third, and fourth sets of word windings being arranged in orthogonal fashion and being positioned immediately adjacent said first, second, third, and fourth sets of row windings respectively;

each of said sets of word windings further comprising x and Y selection means coupled to opposite ends of selected ones of said word lines for word selection purposes;

said keeper board means also minimizing electromagnetic coupling between said first and third sets of word windings and said second and fourth sets of word windings.

2. The assembly of claim 1 wherein each of the sets of word lines further comprises insulation means for electrically insulating each of the word lines in a set from one another.

3. The magnetic memory assembly of claim 1 further comprising first, second, third and fourth diode switching sets, each being electrically connected to an associated word line of said first, second, third, and fourth sets of word windings, respectively;

said first and third diode switching sets being arranged along one side of said first and third word windings and said second and fourth diode switching sets being arranged along the opposite side of said second and fourth wordwindings so that said second and fourth and said first and third diode switching sets are on opposite sides of said word winding arrays;

said Y-input selection terminals being electrically connected to selected ones of said diodes in each of said first, second, third, and fourth sets of row windings;

said X-input terminal sets each being electrically coupled to opposite ends of the word lines in each of said first, second, third, and fourth sets of word lines wherein the selection of any X-input terminal and any Y input terminal in a given set of word windings electrically connects only one word line in the set of word windings for driving the row windings associated therewith.

4. The magnetic memory assembly of claim 1 wherein said first, second, third, and fourth sets of row windings respectively cooperate with said first, second, third, and fourth sets of word windings to form first, second, third, and fourth memory planes;

said first and third memory planes being positioned on one side of said mounting board; and said second and fourth memory planes being positioned on the opposite side of said mounting board.

5. The assembly of claim 4 wheren each winding of each of said first, second, third, and fourth sets of row windings is coated with a magnetic material.

* * * * *